United States Patent
Akers et al.

(10) Patent No.: US 8,458,500 B2
(45) Date of Patent: Jun. 4, 2013

(54) SERVER ALLOCATION TO WORKLOAD BASED ON ENERGY PROFILES

(75) Inventors: Jason B. Akers, Bay Village, OH (US);
Ross B. Clay, Raleigh, NC (US);
Michael C. Hollinger, Austin, TX (US);
Ryan A. Holt, Uxbridge, MA (US);
Perry L. Jones, Bethesda, MD (US)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 12/627,765

(22) Filed: Nov. 30, 2009

(65) Prior Publication Data

US 2011/0131431 A1 Jun. 2, 2011

(51) Int. Cl.
*G06F 1/00* (2006.01)
*G06F 1/26* (2006.01)
*G06F 1/32* (2006.01)

(52) U.S. Cl.
USPC ............................................ 713/320; 713/300

(58) Field of Classification Search
USPC ................................................. 713/300, 320
See application file for complete search history.

(56) References Cited

U.S. PATENT DOCUMENTS

| | | | |
|---|---|---|---|
| 6,202,080 B1 | 3/2001 | Lu et al. | |
| 6,321,317 B1* | 11/2001 | Borowsky et al. | 711/170 |
| 6,985,952 B2 | 1/2006 | Bohrer et al. | |
| 7,269,751 B2 | 9/2007 | Janakiraman et al. | |
| 7,386,739 B2 | 6/2008 | Ghiasi et al. | |
| 7,421,368 B2 | 9/2008 | Dalton et al. | |
| 7,461,274 B2* | 12/2008 | Merkin | 713/300 |
| 7,594,128 B2* | 9/2009 | Bacchus et al. | 713/300 |
| 7,644,051 B1* | 1/2010 | Moore et al. | 706/21 |
| 7,844,839 B2* | 11/2010 | Palmer et al. | 713/300 |
| 2008/0141048 A1* | 6/2008 | Palmer et al. | 713/300 |
| 2009/0037162 A1 | 2/2009 | Gaither et al. | |
| 2009/0132840 A1 | 5/2009 | Talwar et al. | |
| 2009/0164660 A1 | 6/2009 | Abrams | |
| 2009/0168345 A1 | 7/2009 | Martini | |
| 2009/0265568 A1* | 10/2009 | Jackson | 713/320 |
| 2010/0082290 A1* | 4/2010 | Wood et al. | 702/179 |
| 2010/0161368 A1* | 6/2010 | Dawson et al. | 705/8 |

OTHER PUBLICATIONS

Gerow, J.; Power Supply Efficiency; Item; Article; Date: Jun. 26, 2006; Motherboards.org; http://www.motherboards.org/articles/guides/1487_7.html.

IBM; IBM BladeCenter JS22 Express Blade; Item: Whitepaper; Date: Oct. 2008; IBM Corporation; Somers, NY, USA.

IBM; IBM Power 550 Express Server; Item: Whitepaper; Date: Apr. 2009; IBM Corporation; Somers, NY, USA.

Shu, J.; Policy of File Migration at Server in Cluster File System; Item: Article—2004 IEEE International Symposium on Cluster Computing and the Grid; Date: 2004; IEEE; Computer Science and Technology Department, Tsinghua University, Beijing, P.R. China.

(Continued)

*Primary Examiner* — Mark Connolly
(74) *Attorney, Agent, or Firm* — Mark Vallone; Robert C. Rolnik

(57) ABSTRACT

Assigning a server among a plurality of servers to a workload. A workload distributor generates at least one energy profile for each server among the plurality of servers. The workload distributor receives a request to assign a workload, the request having a resource requirement. The workload distributor selects a subset of servers by comparing, for each server at least one energy profile to the resource requirement. The workload distributor selects from the subset of servers a selected server based on the workload and/or energy profile. The workload distributor dispatches the workload to the selected server.

8 Claims, 5 Drawing Sheets

OTHER PUBLICATIONS

Khan, O.; A Framework for Predictive Dynamic Temperature Management of Microprocessor Systems; Item: Article; Date: May 2008; IEEE; Department of Electrical and Computer Engineering, University of Massachusetts Amherst, Amherst, MA, USA.

Coskun, A.K.; Temperature Management in Multiprocessor SoCs Using Online Learning; Item: Article; Date: Jun. 2008; ACM; 2008, Anaheim, CA, USA.

Coskun, A.K.; Proactive Temperature Balancing for Low Cost Thermal Management in MPSoCs; Item: Article; Date: May 2008; IEEE.

IBM; IBM EnergyScale for POWER6 Processor-Based Systems; Item: Whitepaper; Date: Oct. 2009; IBM Corporation; Somers, NY, USA.

Weddle, C.; Paraid: A Gear-Shifting Power-Aware RAID; Item: Article13, vol. 3, No. 3 Date: Oct. 2007; ACM.

Eberle, H.; High-Radix Crossbar Switches Enabled by Proximity Communication; Item: Article; Date: Nov. 2008; IEEE.

IBM; Optimizing the Energy Consumption of a Group of Servers; Item: Article; Date: Apr. 8, 2008; IP.com.

Kusic, D.; Power and Performance Management of Virtualized Computing Environments Via Lookahead Control; Item: Article; Date: May 2008; IEEE.

Das, R.; Autonomic Multi-Agent Management of Power and Performance in Data Centers; Item: Article; Date: May 2008; International Foundation for Autonomous Agents and Multiagent Systems; http://www.ifaamas.org.

\* cited by examiner

| | |
|---|---|
| 501 — | WORKLOAD 1 |
| 503 — | SUBSYSTEM INTENSITY: PROCESSOR; MEMORY; I/O |
| 505 — | CHARACTERIZATION = BURSTY |
| 507 — | MINIMUM MIPS = 30 |
| 509 — | PARALLELISM = AT LEAST 4 PROCESSORS |
| 511 — | MINIMUM MEMORY = 25 GB |
| 513 — | NETWORK THROUGHPUT MINIMUM = 1 Gbps |
| 515 — | TOTAL EXECUTION TIME = 8 HOURS |
| | |
| | |
| | |

| | |
|---|---|
| 403 — | SERVER 1 |
| 405 — | PROFILE = STATIC POWER SAVE |
| 407 — | FREQUENCY = 1.5 GHz |
| 409 — | VOLTAGE = 3.0 V |
| | PROCESSOR NAP = NOT AVAILABLE |
| 411 — | FAN SPEED = 0-7000 RPM |
| 415 — | MEMORY POWER DOWN = AVAILABLE |
| 416 — | RAM LATENCY = 0.11 ns |
| 417 — | PROCESSOR SLEEP = NOT AVAILABLE |
| 419 — | MEMORY BANDWIDTH CONTROL = NA |
| 421 — | WATTS PER INSTRUCTION = 0.00025 |
| 425 — | GREENHOUSE PROFILE: 20% NUCLEAR; 40% COAL; 40% HYDRO |
| 427 — | IO LATENCY = 9 ns |

SERVER ALLOCATION TO WORKLOAD BASED ON ENERGY PROFILES

BACKGROUND OF THE INVENTION

1. Field of the Invention

The present invention relates generally to a computer implemented method, data processing system, and computer program product for allocating or migrating workloads to hardware to use energy efficiency as a factor in selecting hardware. More specifically, the present invention relates to obtaining energy profiles for one or more servers so that a lowest energy use per computer operation may be selected.

2. Description of the Related Art

Modern uses of networked computers leverage flexibility to migrate or initially assign workloads among servers in a data center. A workload is one or more processes executing on one or more processors that share a common motherboard and/or bus system. Each process may run continuously to support a function, and may periodically spawn additional processes in an ad hoc manner. Each process may coordinate handling of work by coordinating execution on processors on a separate data processing system on a separate motherboard from where the process is executing. Accordingly, the workload can be multiple processes executing on multiple servers in a coordinated matter to process data.

A workload distributor is a data processing system that assigns and dispatches workloads to servers under its control. The conventional workload distributors account for resource requirements established by a customer to the data center and assign servers to accommodate throughput requirements as well as provide, if required, an appropriately sized cushion of excess capacity to permit rapid bursts in process activity to be timely handled by the assigned server.

Recently, servers have been offered that permit controlled degradation of performance in favor of reducing the energy consumed by the server. In addition, some servers can be placed in a very low power state if workloads can be transferred off the server or otherwise idled. Nevertheless, such servers may be responsive to being assigned new loads with some latency period to transition from low power.

Importantly, newer servers added to a data center can have energy profiles that offer higher workload throughput per watt of energy consumed as compared to legacy servers in the data center. Accordingly, where a disparity exists in power consumed per machine operation, a cost savings may occur when a workload is dispatched to a new server as compared to a legacy server offering a lower throughput per watt.

SUMMARY OF THE INVENTION

The present invention provides a computer implemented method, and computer program product for assigning a server among a plurality of servers to a workload. A workload distributor generates at least one energy profile for each server among the plurality of servers. The workload distributor receives a request to assign a workload, the request having a resource requirement. The workload distributor selects a subset of servers by comparing, for each server at least one energy profile to the resource requirement. The workload distributor selects from the subset of servers a selected server based on the workload and/or energy profile. The workload distributor dispatches the workload to the selected server.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is an energy profile data structure in accordance with an illustrative embodiment of the invention;

FIG. 5 is a resource requirement of a workload in accordance with an illustrative embodiment of the invention;

DETAILED DESCRIPTION OF THE PREFERRED EMBODIMENT

Figure 1:
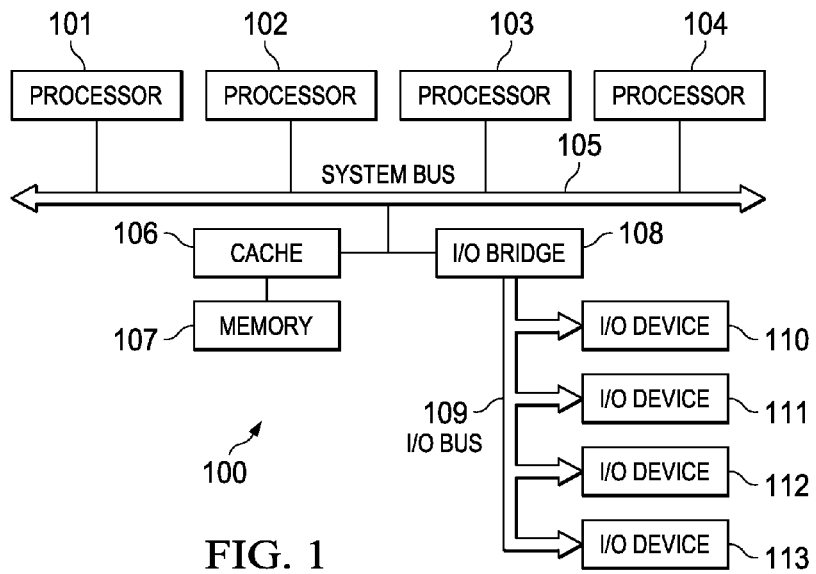
FIG. 1 is a block diagram of a data processing system in accordance with an illustrative embodiment of the invention.
Figure 2:
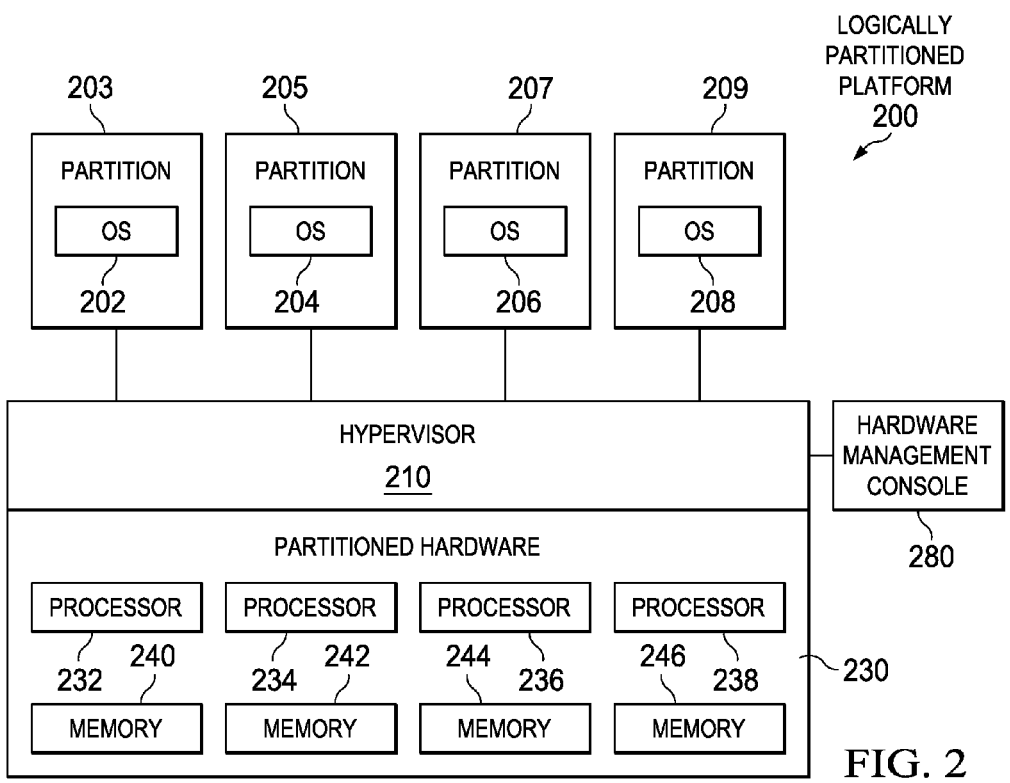
FIG. 2 is a block diagram of an exemplary logically partitioned platform in accordance with an illustrative embodiment of the invention.
Figure 3:
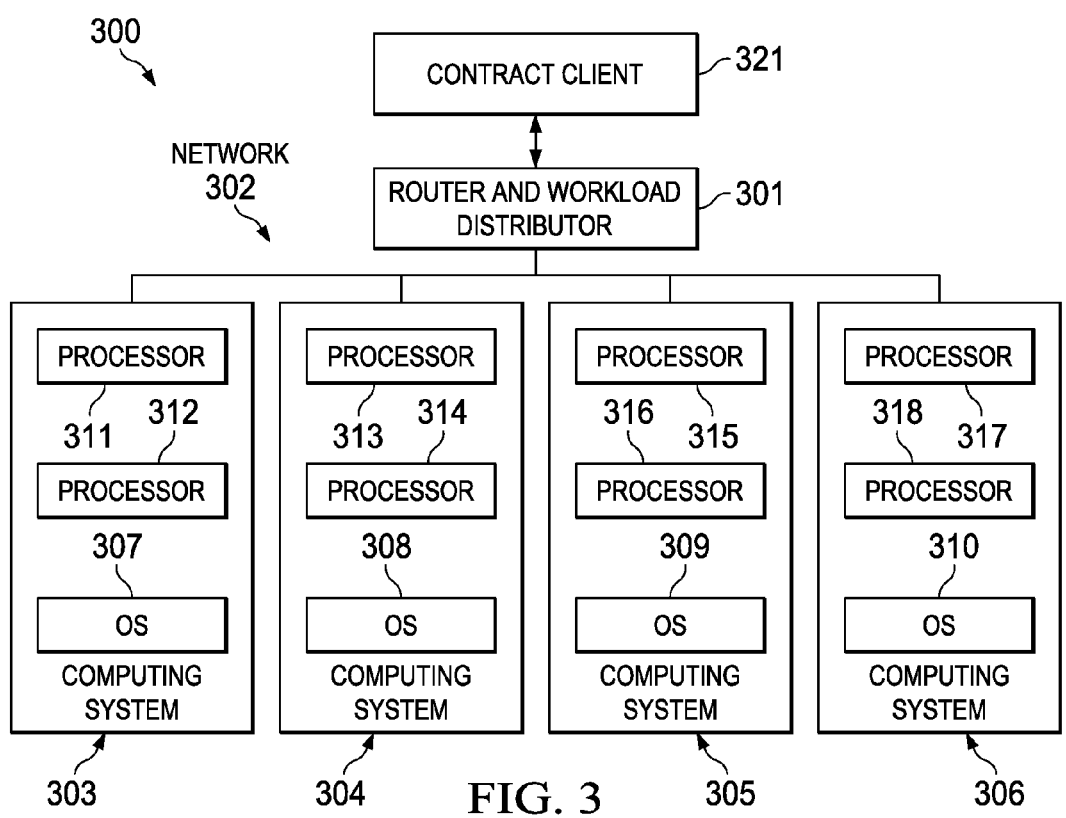
FIG. 3 is an exemplary data center of computing systems in accordance with an illustrative embodiment of the invention.

Illustrative embodiments of the invention provide a method, apparatus and computer program product for dispatching workloads to servers, and optionally adjusting processor voltages and frequencies based on resource requirements including power constraints, among others. The data processing device may be a stand-alone computing device, a cluster of computing devices operating as a single system or a distributed data processing system in which multiple computing devices are utilized to perform various aspects of the present invention. Therefore, the following FIGS. 1, 2, and 3 are provided as exemplary diagrams of data processing environments in which the invention may be implemented. FIGS. 1, 2, and 3 are only exemplary and are not intended to assert or imply any limitation with regard to the environments in which the invention may be implemented. Many modifications to the depicted environments may be made without departing from the spirit and scope of the invention.

With reference now to the figures, and in particular with reference to FIG. 1, a block diagram of a data processing system in which the invention may be implemented is depicted. Data processing system 100 may be a symmetric multiprocessor (SMP) system including a plurality of processors 101, 102, 103, and 104 connected to system bus 105. For example, data processing system 100 may be an IBM® Power Systems™ server, a product of International Business Machines Corporation of Armonk, N.Y. Also connected to system bus 105 is memory cache 106, which provides cache memory and an interface to system memory 107. I/O bus bridge 108 is connected to system bus 105 and provides an interface to I/O bus 109. I/O bus 109 connects the I/O bus bridge 108 to a plurality of I/O devices, 110, 111, 112, and 113. Data processing system 100 may be implemented using various commercially available computer systems. For example, data processing system 100 may be implemented using IBM® Power® 595 system available from International Business Machines Corporation.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Java is a trademark of Sun Microsystems, Inc. in the United States, other countries, or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 2 is a block diagram of an exemplary logically partitioned platform is depicted in accordance with an illustrative embodiment of the invention. The hardware in the logically partitioned platform 200 with partitions 203, 205, 207, and 209, may be implemented as, for example, data processing system 100 in FIG. 1. Logically partitioned platform 200 includes partitioned hardware 230, operating systems 202, 204, 206, 208, and hypervisor 210. Operating systems 202, 204, 206, and 208 may be multiple copies of a single operating system or multiple heterogeneous operating systems simultaneously running on logically partitioned platform 200. These operating systems may be implemented using the Linux operating system and are designed to interface with a hypervisor. Operating systems 202, 204, 206, and 208 are located in partitions 203, 205, 207, and 209, respectively.

Partitioned hardware 230 includes a plurality of processors 232-238, a plurality of system memory units 240-246, and a plurality of input/output (I/O) adapters 248-262. Each of the processors 232-238, memory units 240-246, and I/O adapters 248-262 may be assigned to one of multiple partitions within logical partitioned platform 200, each of which corresponds to one of operating systems 202, 204, 206, and 208.

The hypervisor 210 performs a number of functions and services for partitions 203, 205, 207, and 209 to create and enforce the partitioning of logical partitioned platform 200. Hypervisor software is available from many companies including the International Business Machines Corporation. Thus, hypervisor 210 allows the simultaneous execution of independent OS images 202, 204, 206, and 208 by virtualizing all the hardware resources of logical partitioned platform 200. Operations of the different partitions may be controlled through a hardware management console, such as hardware management console 280.

FIG. 3 is an exemplary data center of computing systems in accordance with an illustrative embodiment of the invention. The cluster 300 consists of a router and workload distributor 301 connected by the network links 302 to computing systems 303, 304, 305, and 306, each running an operating system image, 307, 308, 309, and 310. Each computing system also contains one or more processors, shown here as 311-312, 313-314, 315-316, and 317-318. Each computing system can be a server. A server is a data processing system that processes data in response to requests by another data processing system or other input channels. A server can be a logical partition to which specific hardware is allocated.

Workload distributor 301 may negotiate server assignments by receiving and responding to requests sent from contract client 321. Contract client 321 may be a data processing system operated by a user that is authorized to pay a data center operator for use, in part or in whole, of servers in the data center. Contract client 321 may be in a domain or network different than that of the workload distributor. Accordingly, communications between the contract client and the workload distributor may be mediated by an intermediary network such as the Internet. In addition, contract client 321 may communicate with workload distributors operated by other data centers. In such an arrangement, the contract client may solicit multiple responses from multiple data center operators through their respective workload distributors. Such responses can provide feedback in response to requesting availability of resources and attributes of such available resources. As a result, the contract client may select, directly or indirectly, resources of a data processing system that both satisfy resource requirements of a workload and optimize resources dispatched to the workload such that energy use can be lowest among the resource options provide by the workload distributors.

FIG. 4 is an energy profile data structure in accordance with an illustrative embodiment of the invention. An energy profile is a data structure that describes throughput and energy characteristics. Throughput can be expressed by values in data fields, such as, for example, processor instructions per unit of time, memory speed, and I/O bandwidth, among others. Energy characteristics can include energy used by a processors operation, energy used per memory access and energy used per bandwidth usage. The energy characteristics can be, for example, watts per processor instruction. The energy characteristics can be an expression of greenhouse gasses emitted per instruction. The energy characteristics can account for direct costs of power provided to the processor, memory, and I/O circuits. The energy characteristics can account for costs to provide cooling by way of fans and coolant circulation within the chassis of a data processing system. The energy characteristics can account for costs to provide heating, ventilation, and/or air conditioning to the workload. In addition, the energy characteristics can describe one or more equations that relate energy consumed to a varying rate of processor instructions, memory use or I/O use. Such equations can account for excess capacity that may go unutilized at low demand for the workload. Alternatively, such equations can account for a likelihood that the excess capacity allocated to a second workload in a pooling arrangement. In this pooling arrangement, energy use for the predicted additional workloads is credited back to the primary workload.

Accordingly, energy profile may identify a server with server identifier 403. The energy profile may have a unique identifier such as profile name 405. The energy profile may specify frequency 407, voltage 409, and processor nap status for one or more processors. Processor nap is a low-power mode that stops processor execution in response to an absence of work to do on that processor core. For example, some or all circuits in a processor may be clocked off to reduce power consumption, and attendant heat.

The energy profile can specify cooling characteristics such as fan speed 411. The energy profile can specify availability or setting of unpowered memory 415. The energy profile can indicate availability or setting of processor sleep 417. Random Access Memory (RAM) latency 416 may also be specified. In addition, the energy profile can indicate availability or setting of memory bandwidth control 419.

The energy profile also may describe the watts per instruction 421. The watts per instruction may be a constant, as shown in FIG. 4. An arrangement of a constant expressing the watts per instruction can be used where a server has many profiles that each provide for different watts per instruction. Such a server can provide fine-tuned gradations of watts per instruction by setting different numbers of processor to sleep, adjusting frequencies, etc., in a distinct manner for each profile. Alternatively, the watts per instruction may be an equation that relates one or more variables, for example, fan speed, varying values of RAM latency, varying numbers of processors in sleep mode, among others.

In addition, illustrative embodiments can account for power use external to a server. For example, energy used by heating, ventilation and/or air conditioning (HVAC) can be estimated based on efficiency of the cooling, insulation, and current weather. Thus, a pro-rata share HVAC energy for the hardware operations can also be added either within the energy profile, or by aggregation by operation of the workload director. A pro-rata share HVAC energy can be determined by calculating the heat output of the hypothetical hardware resource assignment as well as heat generated by supporting subsystems divided by the aggregate of heat generated by the data center.

In addition, a greenhouse gas factor can be established by multiplying estimated watt consumptions by expected or estimated greenhouse gas emissions. Thus, for example, the energy profile can describe power sources in greenhouse profile 425. Applying well-known estimates of gas emissions per watt, and applying a proportion of each energy source to the gas emissions expected per energy source, a workload distributor can determine an estimated green house gas impact of the workload. A greenhouse gas is an atmospheric gas that is opaque to heat radiation. Greenhouse gasses include molecules that comprise at least one carbon atom, for example, carbon dioxide, and methane. Thus, an energy source describes a technology used to provide electricity. Examples of technologies that can operate as energy sources include, nuclear, coal, hydro-electric, solar, wind, natural gas, co-generation, among others. Accordingly, greenhouse profile 425 may record a proportion of the energy use is delivered or predicted to be delivered from each technology.

Furthermore, an energy profile data structure can include an indication of input/output (IO) latency. IO latency is delays that occur between the presentation of data to an I/O interface and the delivery of data to the network, or vice-a-versa. In other words, the IO latency can be the time delays caused when transmitting or receiving information from server to network. IO latency may be stored as IO latency 427.

In addition, each logical partition within a server may be allocated as a part of the energy use lost by inefficiencies of a power supply. A power supply is a subsystem of a server that converts or regulates incoming alternating current or direct current into required direct current levels, and may perform some power conditioning to reduce the effects of transient power fluctuations. For example, a power supply may power the operations of four logical partitions. If 25 Watts of the power supply are lost to the production of heat, the energy lost in this manner can be assigned to each logical partition, and the workload operating therein, according to a pro-rating function of the resources used by the workload. Accordingly, pro-rated allocation of energy can be energy consumption allocated to power supply inefficiencies, HVAC use, or both.

As an alternative to recording energy providers in an energy profile, a workload distributor may record an apportionment of energy providers that applies to all servers in a data center.

FIG. 5 is a resource requirement of a workload in accordance with an illustrative embodiment of the invention. The resource requirement can be stored in a data structure, and can be communicated from a contract client to a data center operator by transmitting directly or indirectly the resource requirement to the workload distributor. A data center operator is an owner, lessee, contractor, or other personnel assigned to operate a data center. A resource requirement can include conditions that must be satisfied in order for a workload to be satisfactorily operated. The resource requirement can also include characteristics of the workload that inform a data center in what manner the workload may cooperate with other workloads. Characteristics can be subsystem intensity 503 and characterization 505. The resource requirement can be used to exclude servers from a pool of candidate servers for the reason that the server fails to meet one or more conditions set in the resource requirement. Such candidates of servers or subset of servers can be an initial screen of servers that satisfy resource requirements that concern timeliness and throughput of the workload.

Workload 500 may include workload identifier 501. In addition, workload 500 can include a characterization of the demands that the workload may place on a server. For example, a workload may place more emphasis on processor operations as compared to frequency of memory access or I/O bandwidth. Accordingly, subsystem intensity 503 is a measure of the relative importance of a subsystem, such as, for example, processor, memory or I/O. Thus, a first listed item in a subsystem intensity field may be the subsystem that is most heavily used, by comparison with other subsystems. In the example shown, memory is less intensely used than the processor or processors. Similarly, an I/O subsystem is used less intensely than the memory. Alternatively, the intensities and emphasis on subsystems can be expressed as "batch", "grid", and "online transaction processing" (OLTP), which can describe critical subsystems that operate as bottlenecks for a workload.

In addition, workload characterization may include a description of the likelihood that the demand on the server will be volatile or bursty. Characterization 505 records an extent to which the workload can be expected to be volatile, or at least a desire by the contract client to have surplus resources available to satisfy rapid changes in demand.

Conditions can be expressed as inequalities or comparisons to minimum values and maximum values. Minimum values, for example, minimum million instructions per second (MIPS) 507, parallelism 509, minimum memory 511, and network throughput minimum 513 are each examples of inequalities that may set a threshold that a server must surpass before being selected to be among a subset of servers that satisfy resource requirements of the workload. In addition, a condition can be expressed as a maximum value, such as, total execution time 515. As can be appreciated, the condition can be expressed as a maximum, for example, as a maximum latency to access memory.

Figure 6:
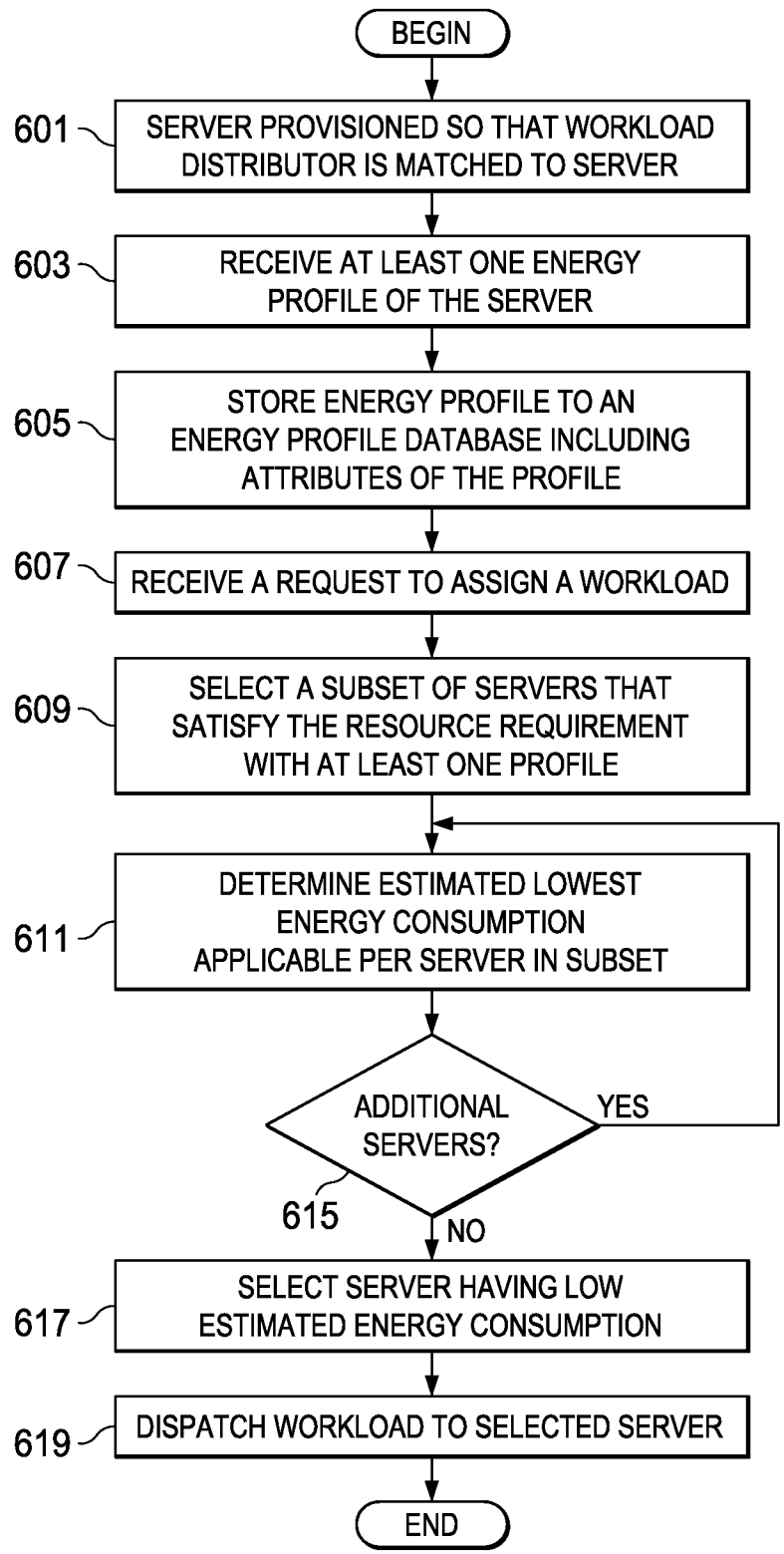
FIG. 6 is a flowchart of a process that a workload distributor may perform to select a server to match a workload in accordance with an illustrative embodiment of the invention.

FIG. 6 is a flowchart of a process that a workload distributor may perform to select a server to match a workload in accordance with an illustrative embodiment of the invention. Initially, the workload distributor may operate in a data center where a server is provisioned so that a workload distributor is provided workload dispatch control with respect to the server. In other words, the server is provisioned so that the workload distributor is assigned to the server (step 601). The establishment of a workload distributor for a server can include substeps of authenticating each machine by exchanging credentials; reporting capabilities of the server to the workload distributor; and queries from the workload distributor concerning specifics of each capability. A capability may be determined to be present on a server where machine instructions enable a hardware feature that is latently present in a configuration. Accordingly, where hardware supports a function, and the function or feature is enabled by software, the capability to perform the function or feature is associated with the server. Next, the workload distributor receives at least one energy profile of the server (step 603). The workload distributor can receive the energy profile contemporaneously with the server being provisioned. Alternatively, the workload distributor can receive the energy profile on a dynamic basis, as modules are added to the server, as resources become available, or as capabilities change.

Next, the workload distributor may store the energy profile to an energy profile database that includes attributes of the profile (step 605). The attributes of the profile may be attributes 403-425 of FIG. 4. Next, the workload distributor may receive a request to assign a workload (step 607). The request to assign a workload may be from a contract client, for example, contract client 321 of FIG. 3. A request to assign a workload can be a session that includes a message transmitted from contract client. The message can include resource requirements, for example, resource requirement 500 of FIG. 5. The session can include logging in, authenticating, uploading or otherwise receiving the message. The session may or may not include negotiating payment for computer operations expected to be performed at a data center. Nevertheless, the request may be merely a request, which can elicit a response from the workload distributor, which forms an offer for matching the workload to a server indicated in the request. Such an offer may be rejected or otherwise ignored by a user and/or the contract client.

Next, the workload distributor may select a subset of servers that satisfy the resource requirement with at least one energy profile (step 609). Thus, the workload distributor may select, for each selected server, at least one energy profile that satisfies the resource requirement. The workload distributor may perform additional steps on the subset of servers.

Next, the workload distributor may determine an estimated energy consumption applicable per server in the subset of servers (step 611). An estimated energy consumption includes an estimate of direct energy used to operate a data processing subsystem to perform a computer operation. Accordingly, the estimated energy consumption can be based on an energy profile and be responsive to at least a watts per instruction, for example, watts per instruction 421 of FIG. 4. In addition, the estimated energy consumption can include pro-rata HVAC costs, which can vary on a seasonal basis. Furthermore, the estimated energy consumption can include greenhouse gas emissions applicable to both the direct energy used as well as pro-rata HVAC. The estimated energy consumption applicable to the server can be the energy profile that meets the resource requirements with the lowest estimated energy consumption.

The estimated energy consumption can be based on estimated utilization of the resources or on prior history in at least three ways. First, the estimated energy consumption may be calculated based on a total resources reserved for the workload. Second, the estimated energy consumption may be calculated based on an average use of resources expected of the workload. Third, the estimated energy consumption may be based on statistics of the workload. Accordingly, the estimated energy consumption can be calculated using the energy profile applicable to the server resources and the workload.

The workload distributor may determine if additional servers remain without an estimated energy consumption (step 615). If further servers remain without an estimated energy consumption applicable to the workload, the workload distributor may estimate an energy consumption for the next such server at step 611. However, if no additional server remains without an estimated energy consumption the workload distributor may perform step 617.

The workload distributor may select from the subset of servers a selected server based on the estimated energy consumption estimated in step 611. For example, the workload distributor may select a server having a low estimated energy consumption (step 617). In some cases the low estimated energy consumption will be the lowest in the subset of servers. Alternatively, the workload distributor may select a server having a low estimated energy consumption. Such a server may have an associated low estimated energy consumption by comparison to at least one estimated energy consumption of a second server from among the subset. In this alternative situation, the workload distributor may perform a cost-benefit analysis that applies additional factors in selecting the server.

Among the factors that can be applied in such a cost-benefit analysis can be a compatibility assessment of two workloads that share a common server using a common energy profile. For example, a characterization of a workload as being bursty can make such a workload compatible with a limited set of other workloads for using a common energy profile of a common server. "Bursty" is a term used to describe a continuum of workload behavior, and is a term used as an opposite or in contrast to "stable" to describe volatility of resource utilization of the workload based on expected inputs. A bursty workload can be a workload that doubles in processor utilization in less than a second. Measures of burstiness may be in accordance with a metric, as described as degree of burstiness in U.S. Patent Application 2008/0022285, incorporated by reference herein.

In practice, stable workloads can operate using a common server without conflicting requests for resources of the server, as may occur from other workloads dispatched to the server. In contrast, the bursty workloads can be assigned a server and avoid conflicts when a) there is a low probability of contemporaneous spikes in use of the resources by the workloads so-dispatched; and b) adequate buffer of excess resources is allocated. An adequate buffer can be described in relation to the average of all the workloads' resource utilizations on the server. For example, the adequate buffer can be 100% of the resources of the average of the workloads' expected or historical average resource utilization. Accordingly, compatibility of the workload with a second workload is a determination that a probability is sufficiently low that the utilization of the resources of the server stays within an acceptable range. Compatibility can be a measure of likelihood of avoiding oversubscribing the computer resources. The range can extend up to 100% of a resource. The range can extend down to 0% of a resource. The range can be expressed in units of a resource, such as, for example, MIPS, memory transfers per second, bandwidth in bits per unit of time, and the like.

Thus, for the example where a server is predominately dispatched to bursty workloads, the cost-benefit analysis may account for the current occupation of the server by workloads by using the expected net burstiness of the aggregate of workloads dispatched to the server to determine a probability that the additional workload assignment will cause conflicting requests for resources of the server. Thus, the workload distributor may select server where the probability is sufficiently low, and the estimated energy consumption is lowest. In contrast, the workload distributor can avoid selecting a server where the addition of a bursty workload will cause a probability of conflicting requests for resources to be unacceptably high. Accordingly, a server can be selected in response to a prediction that the first workload and the second workload or additional workloads are predicted not to make conflicting requests for resources of the server.

Step 617 is not limited to selecting a single server. Nor does step 617 prohibit the selection of a time-shared or otherwise pooling the resources of a server to support multiple workloads. Rather step 617 permits the workload distributor to select one or more servers to coordinate executing the workload. In the instance where multiple servers are relied upon, the workload distributor may select a server having a lowest estimated energy consumption as well as one or more additional servers that are associated with next-lowest estimated energy consumption. Next, the workload distributor may dispatch the workload to the selected server (step 619). Processing may terminate thereafter.

Figure 7:
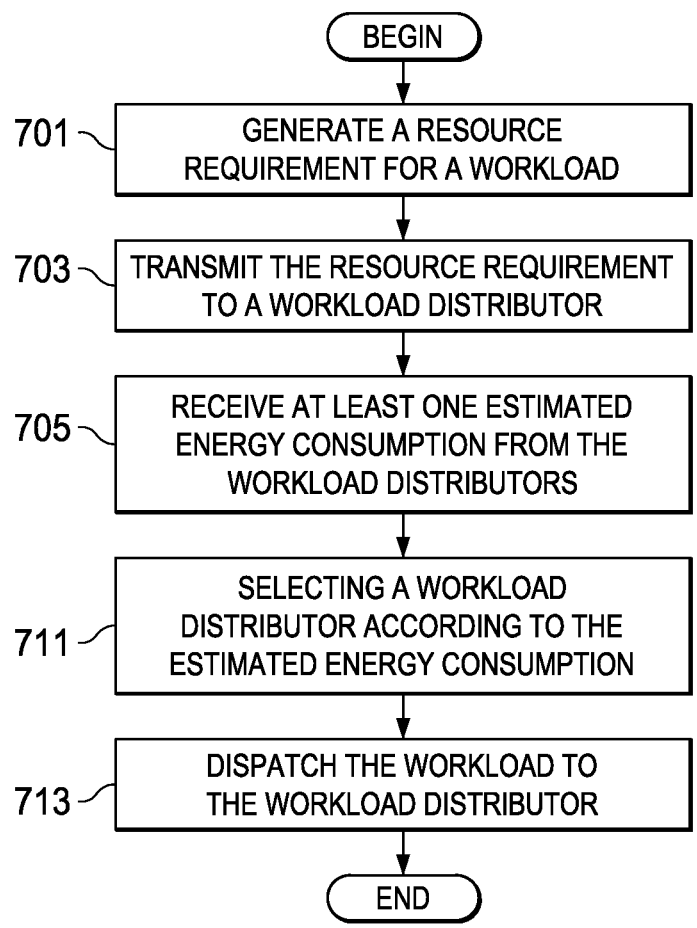
FIG. 7 is a flowchart of a process that a contract client may perform to select a data center to match a workload in accordance with an illustrative embodiment of the invention.

FIG. 7 is a flowchart of a process that a contract client may perform to select a data center to match a workload in accordance with an illustrative embodiment of the invention. Initially the contract client may generate a resource requirement for a workload (step 701). The resource requirement may be a data structure, for example, an XML file or a common information model (CIM) that establishes values for attributes of a resource requirement, for example, in the manner of resource requirement 400 of FIG. 4. The resource requirement may be set according to estimates of use of the workload in commercial operation. The resource requirement may be set based on statistics collected concerning the operation of the workload in practice. By generating, it is meant that the resource requirement can be created by substeps such as via human entry in a user interface, automatic generation of values for attributes, downloading parts or the entirety of the resource requirement from a separate machine, or any combination of these sub-steps.

Next, the contract client may transmit the resource requirement to a workload distributor (step 703). Step 703 may be an iterative step where the contract client transmits the resource requirement to several workload distributors in a manner to solicit server allocations from each data center that each workload distributor manages. Next, the contract client may receive at least one estimated energy consumption from the workload distributors (step 705). Next, the contract client may select a workload distributor according to the estimated energy consumption (step 711). In response to selecting the workload distributor, the contract client may dispatch the workload to the workload distributor (step 713). This step may be performed by transmitting an image comprising one or more files of configuration files, computer instructions, among others, to the workload distributor. Such files can comprise software used by the workload when it executes on the server. Processing may terminate thereafter.

The illustrative embodiments permit a workload distributor, a contract client and/or one or more servers to coordinate the dispatch of a workload to a server in a manner to limit power used while still meeting resource requirements of a workload. The illustrative embodiments permit a user of a contract client to set criteria or otherwise establish priority so that a lowest energy use per computer operation is selected from among servers in one or more data centers. Alternatively, a contract client may coordinate selection of a low energy use per computer operation server in a manner where an improvement to energy efficiency occurs with a limited increase in pricing and/or risks per computer operation.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for assigning a server among a plurality of servers to a workload, the method comprising:
   a computer receiving at least one energy profile for each server among the plurality of servers;
   the computer receiving a request to assign a workload, the request having a resource requirement;

the computer selecting a subset of the plurality of servers by comparing the at least one energy profile for each server among the plurality of servers to the resource requirement;

the computer determining, for each server in the subset, an estimated energy consumption for the server in the subset based on the at least one energy profile corresponding to the server in the subset and a combined estimated energy consumption of the workload and an additional workload assigned to the server in the subset, the combined estimated energy consumption of the workload and the additional workload being formed from a pairing of the workload and the additional workload;

the computer selecting a particular server from the subset based, at least in part, on the determined estimated energy consumption of the particular server being lowest among each server in the subset; and the computer dispatching the workload to the selected particular server.

2. The method of claim 1, wherein the selecting the particular server comprises:

selecting the particular server based in part on compatibility of the workload with the additional workload assigned to the particular server, the compatibility being measured as a determination that the workload and the additional workload are predicted not to make conflicting requests for resources of the particular server.

3. The method of claim 2, wherein the compatibility is a measure of likelihood of avoiding oversubscribing the resources of the particular server.

4. The method of claim 1, wherein the received at least one energy profile comprises at least one value for at least one attribute selected from processor frequency, processor voltage, processor nap, processor shutdown, fan speed, RAM latency, and IO latency.

5. A computer program product for assigning a server among a plurality of servers to a workload, the computer program product comprising: a computer readable storage medium having computer readable program code embodied therewith, the computer readable program code comprising:

computer readable program code configured to receive at least one energy profile for each server among the plurality of servers;

computer readable program code configured to receive a request to assign a workload, the request having a resource requirement;

computer readable program code configured to select a subset of the plurality of servers by comparing the at least one energy profile for each server among the plurality of servers to the resource requirement;

computer readable program code configured to determine, for each server in the subset, an estimated energy consumption for the server in the subset based on the at least one energy profile corresponding to the server in the subset and a combined estimated energy consumption of the workload and an additional workload assigned to the server in the subset, the combined estimated energy consumption of the workload and the additional workload being formed from a pairing of the workload and the additional workload;

computer readable program code configured to select a particular server from the subset based, at least in part, on the determined estimated energy consumption of the particular server being lowest among each server in the subset; and computer readable program code configured to dispatch the workload to the selected particular server.

6. The computer program product of claim 5, wherein the computer readable program code configured to select the particular server comprises:

computer readable program code configured to select the particular server based in part on compatibility of the workload with the additional workload assigned to the particular server, the compatibility being measured as a determination that the workload and the additional workload are predicted not to make conflicting requests for resources of the particular server.

7. The computer program product of claim 6, wherein the compatibility is a measure of likelihood of avoiding oversubscribing the resources of the particular server.

8. The computer program product of claim 5, wherein the received at least one energy profile comprises at least one value for at least one attribute selected from processor frequency, processor voltage, processor nap, processor shutdown, fan speed, and RAM latency.

* * * * *